United States Patent [19]

Möller et al.

[11] Patent Number: 4,504,152
[45] Date of Patent: Mar. 12, 1985

[54] MIXING AND/OR KNEADING APPARATUS

[75] Inventors: Dieter Möller, Osnabrueck; Konrad Böert, Wallenhorst, both of Fed. Rep. of Germany

[73] Assignee: Dierks & Söhne GmbH & Co. KG, Osnabrueck, Fed. Rep. of Germany

[21] Appl. No.: 263,338

[22] Filed: May 13, 1981

[30] Foreign Application Priority Data

May 28, 1980 [DE] Fed. Rep. of Germany ....... 3020167

[51] Int. Cl.³ .............................................. B01F 15/02
[52] U.S. Cl. .................................... 366/188; 366/189; 366/194; 99/348
[58] Field of Search .................... 366/77, 186, 96, 187, 366/97, 188, 98, 189, 184, 194, 197, 200, 222, 223, 224; 99/348

[56] References Cited

U.S. PATENT DOCUMENTS

| | | | |
|---|---|---|---|
| 1,752,833 | 4/1930 | Brumder | 366/222 |
| 2,651,582 | 9/1953 | Courtney | 366/224 |
| 2,722,339 | 11/1955 | Saxon | 366/188 |
| 3,099,040 | 7/1963 | Matsuoka | 366/77 |
| 3,155,056 | 11/1964 | Smith | 366/77 |
| 3,854,627 | 12/1974 | Coons | 366/186 |
| 4,010,932 | 3/1977 | Otto | 366/77 |
| 4,063,715 | 12/1977 | Felker et al. | 366/187 |
| 4,375,336 | 3/1983 | Halley | 366/194 |

FOREIGN PATENT DOCUMENTS 2421720 3/1976 Fed. Rep. of Germany ........ 366/77

Primary Examiner—Philip R. Coe
Assistant Examiner—Frankie L. Stinson
Attorney, Agent, or Firm—Jordan and Hamburg

[57] ABSTRACT

A mixing and/or kneading machine for dough, foodstuff, or the like includes a vat, a support for rotatably supporting the vat for rotation about a vertical axis, the vat having a bottom with an aperture therein and a closure member for the aperture. Operable means are provided for moving the closure member between a closed position in which the closure member closes the aperture and an open position in which the closure member is displaced from a position underlying the aperture such that the contents of the vat are free to exit vertically downwardly from the aperture.

16 Claims, 3 Drawing Figures

MIXING AND/OR KNEADING APPARATUS

BACKGROUND OF THE INVENTION

This invention relates to a kneading and/or mixing machine for dough, foodstuff or similar materials.

In a known prior art apparatus of this type, for example Federal Republic of Germany DE-AS No. 24 21 720, a closure body consists of a guiding part disposed in the central area above the bottom of a vat. The purpose of the closure body is to guide the mass of the material to be worked on radially outwardly into the working area of the working tool. This guiding part is fastened to the lower end of a lifting rod which is capable of moving it from a lower closure position, where its lower side abuts the vat bottom while rotating with it, into an upper open position where the guiding part frees the central bottom aperture in the vat bottom. To that bottom aperture, there is connected a downwardly extending pipe limiting an efflux channel in which a driven delivery worm rotates. The delivery worm protrudes with its upper end over the plane of the vat bottom and this upper end is accepted by the guiding part in a central aperture which is open in the downward direction, while the guiding part is in its closed position.

Such an arrangement of the delivery device is comparatively complicated and expensive. Cleaning of the components of the delivery device is also time consuming and difficult. The delivery process is not only quite time consuming but is particularly associated with an undesirable impact upon the product to be delivered which might impede its further processing. Thus mainly doughs which are compacted undesirably by the action of the worm are considerably deteriorated as far as baking of the dough is considered. This also basically applies to other materials to be mixed, for example salads, sausage meats, etc., which lose their juices when compacted during delivery or may lose other important qualities.

An object of the present invention is to provide a kneading and/or mixing machine which has a simple construction and results in a delivery free of undesirable influences upon the final product or material.

The machine according to the present invention provides a simple manner of delivery defined by a simple efflux or dropping-out of the finally worked-up contents of the vat. These contents may be caught by a container disposed under the bottom aperture of the vat and provided more of less close to it or it may fall upon a conveyor belt and be conveyed away from the vat. Thus the goods to be delivered do not experience any change of direction and no compacting which might change its properties.

Other features which are considered characteristic of the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

The construction and operation of the invention, however, together with additional objects and advantages thereof will be best understood from the following description of specific embodiments when read in connection with the accompanying drawings.

DESCRIPTION OF THE PREFERRED EMBODIMENTS

Figure 1:
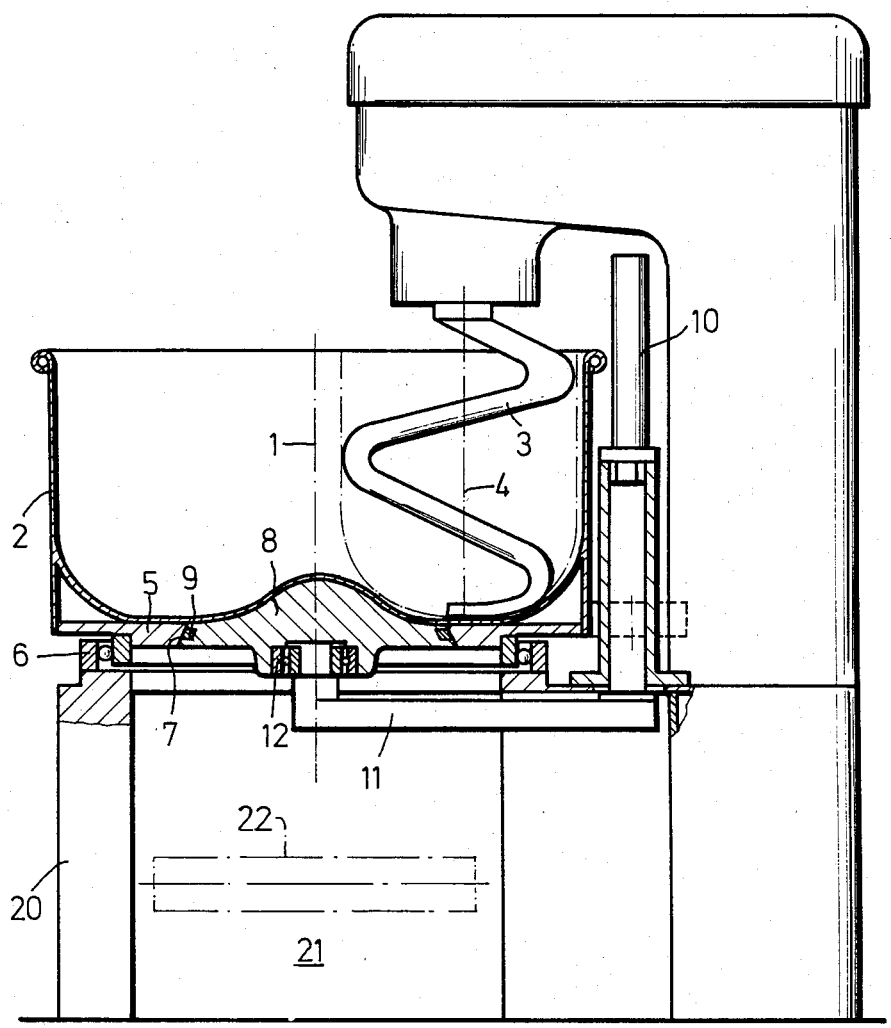
FIG. 1 is a side elevational view partially in section of a machine according to one embodiment of the invention.

The machine shown in the drawings is a spiral-kneading machine and includes a vat 2 rotatable about rotational axis 1 by means of a non-illustrated drive. An operating tool 3 shaped like a kneading spiral extends from the top into the vat 2. This operating tool 3 is driven by a non-illustrated drive and rotates about a rotational axis 4 which is parallel to the rotational axis 1 of vat 2.

Bottom 5 of vat 2 rests upon a ring bearing 6 which surrounds coaxially at a considerable distance the rotational axis 1 of vat 2 and possesses therefore a bearing-free central area. In this area is disposed a coaxial bottom aperture 7 which is large and whose center corresponds to the inner center of the vat. This bottom aperture 7 functions as a bottom recess and has a frusto-conical aperture that decreases upwardly.

According to the position of the parts of FIG. 1, a closure body 8 is located in the bottom aperture 7. The closure body 8 is shown in the closed position in FIG. 1 where it forms a part of the vat bottom 5 and fits sealingly into the bottom aperture 7 by means of its frusto-conical outer rim which also tapers in the upward direction. The closure body 8 is mainly a plate with a flat underside and a top side having an outer rim area abutting flush with the vat bottom 5. The upper side may be completely flat, for example, as may be desired in helical kneading machines or for lift-kneading machines with a kneading arm. In the illustrated embodiment of a spiral kneading machine, however, the upper side of the closure body 8 is arched or curved upwardly symmetrical to the axis of rotation 1 of vat 2 and forms the central guiding body or feeder.

A ring groove which may contain a circular sealing ring 9 is disposed in the closure body 8 at the outer rim of the bottom aperture 7 such that, in the closed position shown, it is disposed opposite to the inner rim of the bottom aperture.

The closure body 8 in the illustrated embodiment shown is freely rotatably supported by a bearing 12 carried on bracket 11 which may be lifted or lowered within limits and which may also be swivelled by a pressure medium drive 10 in the form of a fluid actuator, for example, an air operated or an oil operated actuator. The rotational axis of bearing 10 coincides with the rotational axis 1 of vat 2. Thus the closure body 8 in its closed position is capable of rotating with vat 2 while the bearing 12 transfers to the closure body 8 a certain equalizing mobility relative to bracket 11 as desired for a good fit of the closure body 8 when it is lifted and inserted for closing the bottom aperture 7.

Figure 2:
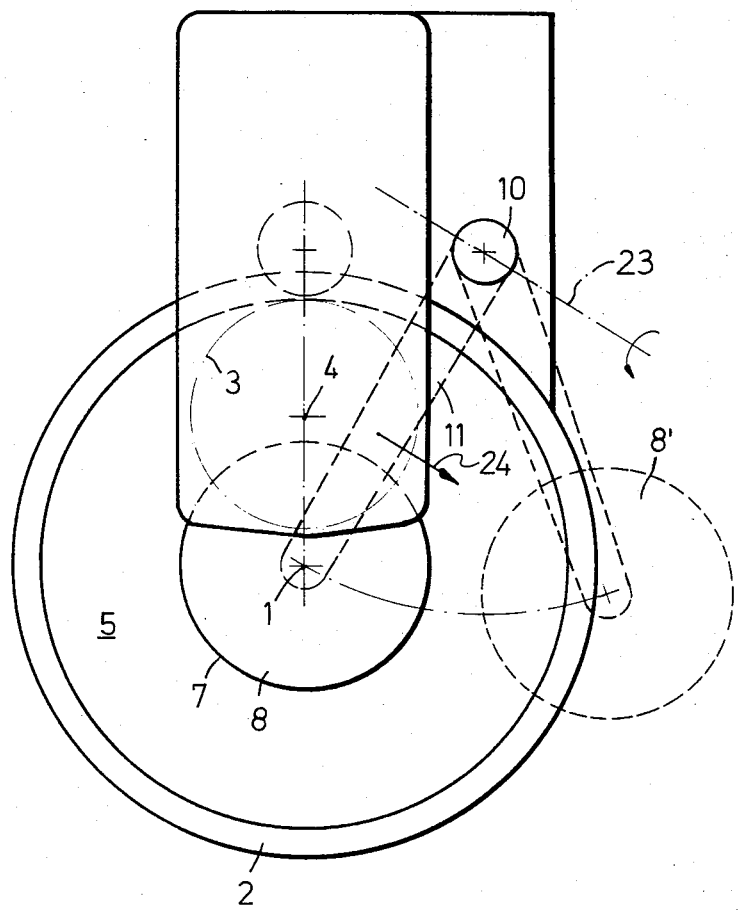
FIG. 2 is a schematic top view of FIG. 1.
Figure 3:
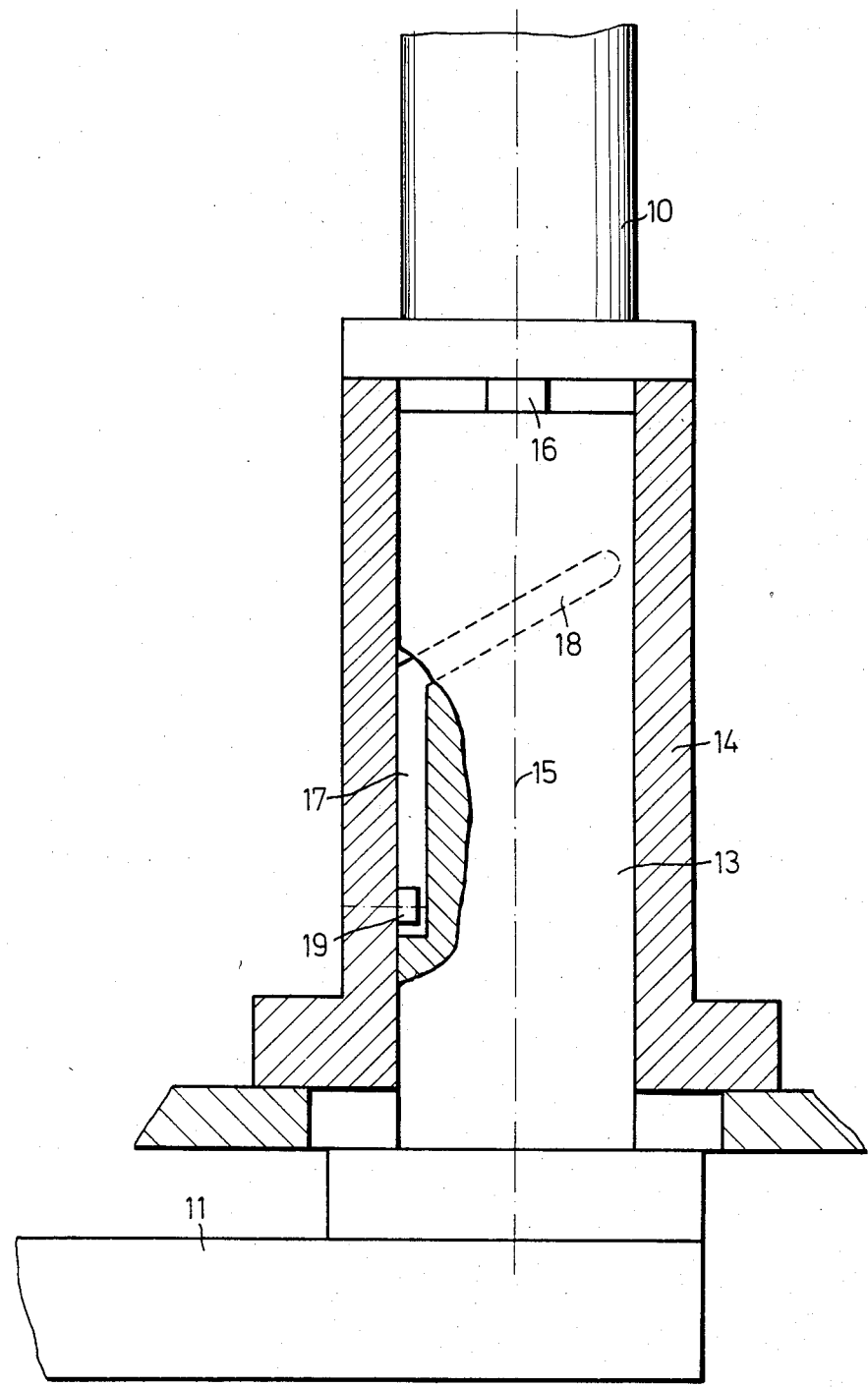
FIG. 3 is a partial sectional view of the drive.

The bracket 11 is fastened to the lower end of a guide and bearing pipe 13 which is supported in a bearing bushing 14. The central axis 15 of the bearing pipe 13 is rotatably and axially movably supported and is vertically disposed parallel to the rotational axis 1 of vat 2. A piston rod 16 of the pressure medium drive 10 extends to the upper end of the guide and bearing pipe 13. At its lower area the guide and bearing pipe 13 possesses a vertical slot 17 which is parallel to the axis and at its upper end, an obliquely rising circumferentially disposed slot 18. A projection 19, a guide roller for instance, is fastened internally to the bearing bushing 14 and engages in this slot 17, 18. Thus when the pressure medium drive 10 moves downwardly, the guide and bearing pipe 13 also moves downwardly together with the bracket 11 and the closure body 8 supported thereupon. Also the projection 19 moves in the vertical slot 17 which is parallel to the axis and, at first, secures against rotational motion the guide and bearing pipe 13. However, once the downwardly moving projection 19 reaches oblique slot 18, it rotates or swivels the guide and bearing pipe 13 around axis 15 so that the closure body 8 initially simultaneously moves downwardly and then after completion of the downward movement, swivels from its position underlying the aperture 7 to a displaced position shown in FIG. 2. This position completely opens the bottom aperture 7. This open position can be seen in FIG. 2 where the swivelled and lowered closure body 8 is shown in dotted lines as indicated at 8'.

In the open position of closure body 8, the completely worked-up contents of the vat may freely exit the vat downwardly without any lateral diversion or deflection and makes simultaneously the closure body accessible for inspection or cleaning.

A free space 21 that extends down to the positional plane of the machine is left open or free in the frame 20 underneath bottom aperture 7. A container may be placed in the free space 21 or also a conveyor belt 22. In factories that work on various levels, as happens very frequently in bakeries, the delivered material may fall directly downwardly to a lower story.

The operating tool 3 and the vat 2 may continue their operational and rotational motions while delivering the product. Both parts run in the same direction when viewed from above. In order to increase the delivering action however, the rotational direction of vat 2 may be reversed so that increased delivery action occurs in a direction towards the center of the vat. That is particularly effective where kneading spirals are used as operational tools. For lift-kneading machines and worm-kneading machines, the working tools have a working region which sweeps the central area so that a sufficient delivery rate results even without reversal of the rotational direction of vat 2. Also it would be possible to utilize a guide part or a similar device, for instance, which guides the product in the vat by scraping towards the bottom aperture 7.

Instead of the illustrated mobility of the closure body 8, a bracket may also be provided which, acting like a flippable carrier, may be swivelled around a swivelling axis 23 which is disposed outside the closure body 8. Furthermore, another embodiment is possible where the closure body 8 is moved sidewards after having moved downwardly, as schematically illustrated by the arrow 24 in FIG. 2.

What is claimed is:

1. A mixing and/or kneading machine for dough, foodstuff, or the like comprising a vat, support means for rotatably supporting said vat for rotation about a vertical axis, said vat having a bottom with an aperture therein, a closure-bearing means for said aperture, said closure-bearing means comprising a closure member and a bearing rotatably supporting said closure member, and operable means for moving said closure-bearing means between a closed position in which said closure member closes said aperture and an open position in which said closure-bearing means is displaced from a position underlying said aperture such that the contents of said vat are free to exit vertically downwardly from said aperture, said operable means comprising a bracket member underlying said vat and mounting said bearing means on which said closure member is rotatably mounted, said bearing means having an axis of rotation coincident with the axis of rotation of said vat, said operable means further comprising a drive means for sequentially operating said bracket member to initially move said bracket member and said closure-bearing means downwardly while precluding pivotal movement and then to subsequently pivot said bracket member and said closure-bearing means about a vertical axis to its open position displaced from a position underlying such aperture such that said bracket member and said closure-bearing means are displaced from a position underlying said aperture, said drive means comprising cooperable elements of which one cooperable element has a slot and the other has a projection moveable within said slot to thereby move said bracket member downwardly and to subsequently pivot said bracket member.

2. A mixing machine according to claim 1 further comprising a working tool means extending into said vat.

3. A mixing machine according to claim 2 wherein said working tool means is a spiral member rotatable about a vertical axis.

4. A mixing machine according to claim 1 further comprising seal means sealing said closure member in said aperture when said closure member is in said closed position.

5. A mixing machine according to claim 1 wherein said closure member has a frusto-conical outer rim which mates with a corresponding matching surface surrounding said aperture, said closure member having a generally flat underside and an inside which mates flush with the inside of said vat.

6. A mixing machine according to claim 1 wherein said support means comprises a ring bearing on which said vat is freely rotatable.

7. A mixing machine according to claim 6 wherein said ring bearing is disposed radially outwardly of said aperture.

8. A mixing machine according to claim 1 wherein the upper side of said closure member has a central ascending portion which generally ascends towards the central axis of rotation of the vat.

9. A mixing machine according to claim 1 further comprising a strand supporting said vat, said stand providing a free space underlying said aperture in said vat.

10. A mixing machine according to claim 9 further comprising a conveyor disposed in said free space.

11. A mixing machine according to claim 1 wherein said vat is operable for rotation in two directions.

12. A mixing machine according to claim 1 wherein the outer diameter of said closure member is equal to 0.6 to 1.2 of the inner radius of said vat.

13. Apparatus according to claim 1, wherein said slot has a first vertical portion joined to a second oblique portion disposed obliquely to said first vertical portion, said projection engaging said first vertical portion to move said bracket member downwardly, said projection engaging said second oblique portion to pivot said bracket member.

14. Apparatus according to claim 9, wherein said drive means comprises a power means operable to apply a vertical force to one of said cooperable elements so that said projection moves from said first vertical portion of said slot to said second oblique portion of said slot, wherein said bracket member is moved downwardly and then pivoted by the application of said vertical force by said power means.

15. A mixing and/or kneading machine for dough, foodstuff, or the like comprising a vat, support means for rotatably supporting said vat for rotation about a vertical axis, said vat having a bottom with an aperture therein, a closure member for said aperture, and operable means for moving said closure member between a closed position in which said closure member closes said aperture and an open position in which said closure member is displaced from a position underlying said aperture such that the contents of said vat are free to exit vertically downwardly from said aperture, said operable means comprising a bracket member underlying said vat and mounting a bearing means on which said closure member is rotatably mounted, said bearing means having an axis of rotation coincident with the axis of rotation of said vat, said operable means further comprising a driving means for operating said bracket member to move said bracket member and the closure member mounted thereon downwardly and to move the bracket member and closure member about a vertical axis to its open position displaced from a position underlying such aperture, said drive means comprising a first member slidably disposed in a second member, said first member also being rotatable in said second member, a slot in one of said members and a projection in the other of said members engaging said slot, a power means for axially moving said first member, said first member being connected to said bracket member such that axial movement of said first member effects both axial and rotational movement of said first member and said bracket as said projection engages in said slot, whereby said bracket means is thereby operable to lower the closure member from its closed position and then pivot the closure member to its open position displaced from a position underlying said aperture.

16. A mixing machine according to claim 15 wherein said first and second members are elongated members having their axes vertically disposed and located radially outwardly of said vat.

* * * * *